United States Patent [19]

Gupta et al.

[11] Patent Number: 5,633,843

[45] Date of Patent: May 27, 1997

[54] USER FRIENDLY COMPACT DISK (CD) READ ONLY MEMORY (ROM) PLAYER

[75] Inventors: Satish Gupta, Pleasantville; Kiyoshi Maruyama, Chappaqua; Steven E. Millman, Spring Valley; Chung-Wai Yue, Yorktown Heights, all of N.Y.; Halil B. Bakoglu, Montesereno, Calif.

[73] Assignee: International Business Machines, Corporation, Armonk, N.Y.

[21] Appl. No.: 506,285

[22] Filed: Jul. 24, 1995

[51] Int. Cl.$^6$ ..................................................... G11B 7/00
[52] U.S. Cl. ................................................. 369/32; 369/53
[58] Field of Search .............................. 369/52, 53, 48, 369/54, 34, 32

[56] References Cited

U.S. PATENT DOCUMENTS

| | | | |
|---|---|---|---|
| 5,136,569 | 8/1992 | Fennema et al. | 369/44.27 |
| 5,237,689 | 8/1993 | Behnke | 395/700 |
| 5,261,104 | 11/1993 | Bertram et al. | 395/700 |
| 5,331,423 | 7/1994 | Ota et al. | 358/392 |
| 5,359,580 | 10/1994 | Miura et al. | 369/32 |
| 5,363,487 | 11/1994 | Willman et al. | 395/275 |
| 5,400,319 | 3/1995 | Fite et al. | 369/52 |
| 5,499,221 | 3/1996 | Ito et al. | 369/52 |

*Primary Examiner*—Nabil Hindi
*Attorney, Agent, or Firm*—Whitham, Curtis, Whitham & McGinn; Kevin M. Jordan

[57] ABSTRACT

A self-contained CD-ROM player which can be installed and used as simply as a VCR. The CD-ROM player includes a CD-ROM drive and supporting hardware and software to activate and execute a program on a CD-ROM disk. It is not necessary to explicitly issue commands to activate and use the disk. The user interface is completely intuitive and simple even for someone who is completely computer illiterate. This player allows everyone, both proficient computer users and those not so proficient, to use the vast library of CD-ROM programs that have been written for personal computers.

18 Claims, 3 Drawing Sheets

USER FRIENDLY COMPACT DISK (CD) READ ONLY MEMORY (ROM) PLAYER

BACKGROUND OF THE INVENTION

1. Field of the Invention

The present invention generally relates to multimedia computer systems of the type supporting compact disk (CD) read only memory (ROM) drives and, optionally, sound and video adapters, and more particularly, to a CD-ROM player which only requires inserting a CD-ROM disk into the CD-ROM drive to activate and execute whatever program may be present on the CD-ROM disk.

2. Background Description

Computers have come into wide spread use, and a wealth of educational and entertainment programs are available on CD-ROM disks. Installation of the CD-ROM disk typically involves copying some files on the CD-ROM disk to the computer's hard drive to take advantage of the throughput speed advantage of the hard drive relative to the CD-ROM drive. This is a tedious, time consuming, error prone, and sometimes expensive process, as when incompatible or the wrong hardware is installed. An intimate knowledge of the system, the drive, the program on the CD-ROM disk, and their dependencies and interactions with one another is required.

A large portion of the population is still unprepared and afraid to go through this process of installation. For those who are prepared and not afraid, difficulties, errors, and frustrations are still extremely common. For example, the proliferation of different kinds of sound cards and video displays from various manufacturers requires a user to know both the specific type of hardware adapters used in his or her system and the specific configuration details of the adapters, such as its interrupt number, address space, and the like. In addition, once successfully installed, the user must remember the specific sequence of commands to execute the program. Though this latter problem has been somewhat addressed by designing intuitive interfaces, such as provided in the Windows and OS/2 operating systems, navigation of the interface still requires some degree of computer knowledge. Furthermore, the majority of the population does not possess this knowledge and, therefore, they cannot avail themselves of the tremendous opportunities and advantages that CD-ROM disks and programs offer in both education and entertainment.

By comparison, typical household devices and appliances, which are widely used by the general public, generally have simple interfaces. For example, video cassette recorders (VCRs) can play any recorded video tape of the right format, requiring the user to insert the tape and push the play button. At the end of play, some VCRs can even rewind and eject the tape cassette automatically.

There are currently available CD-ROM players with proprietary operating systems which require independent software vendors (ISVs) to write software specifically for unique hardware/software configurations. Examples of some of these players include Tandy's Video Information System (VIS), the 3DO player and Phillips CD-i player. Such players, however, can only play CD-ROM disks which are developed for that particular player and cannot play widely available CD-ROMs for personal computers.

SUMMARY OF THE INVENTION

It is therefore an object of the present invention to provide CD-ROM player which is easily installed and used without user knowledge of computer hardware or software installation procedures.

It is a further object of the invention to provide a CD-ROM player that is able to play any CD-ROM disk developed for a personal computer.

It is another object of the invention to provide a CD-ROM player having an architecture and capability that requires a user only to insert a CD-ROM disk into the CD-ROM drive to activate and execute whatever program is present on the CD-ROM disk.

According to the invention, there is provided a self-contained CD-ROM player which can be installed and used as simply as a VCR. As used herein, a CD-ROM player includes a CD-ROM drive and supporting hardware and software to activate and execute a program on a CD-ROM disk. Since it is assumed that when a user inserts a CD-ROM disk into the CD-ROM drive, it is the user's intention to activate and use the disk, and thus it should not be necessary to explicitly issue commands. The user interface is completely intuitive and simple even for someone who is completely computer illiterate. This player allows everyone, both proficient computer users and those not so proficient, to use the vast library of CD-ROM programs that have been written. While the CD-ROM player according to this invention in its preferred form is self-contained, it may be used in conjunction with a personal computer but without the necessity of difficult hardware and software installation.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is flow diagram showing the sequence of events that occurs when the CD-ROM player according to the invention is switched on;

DETAILED DESCRIPTION OF A PREFERRED EMBODIMENT OF THE INVENTION

Figure 1:
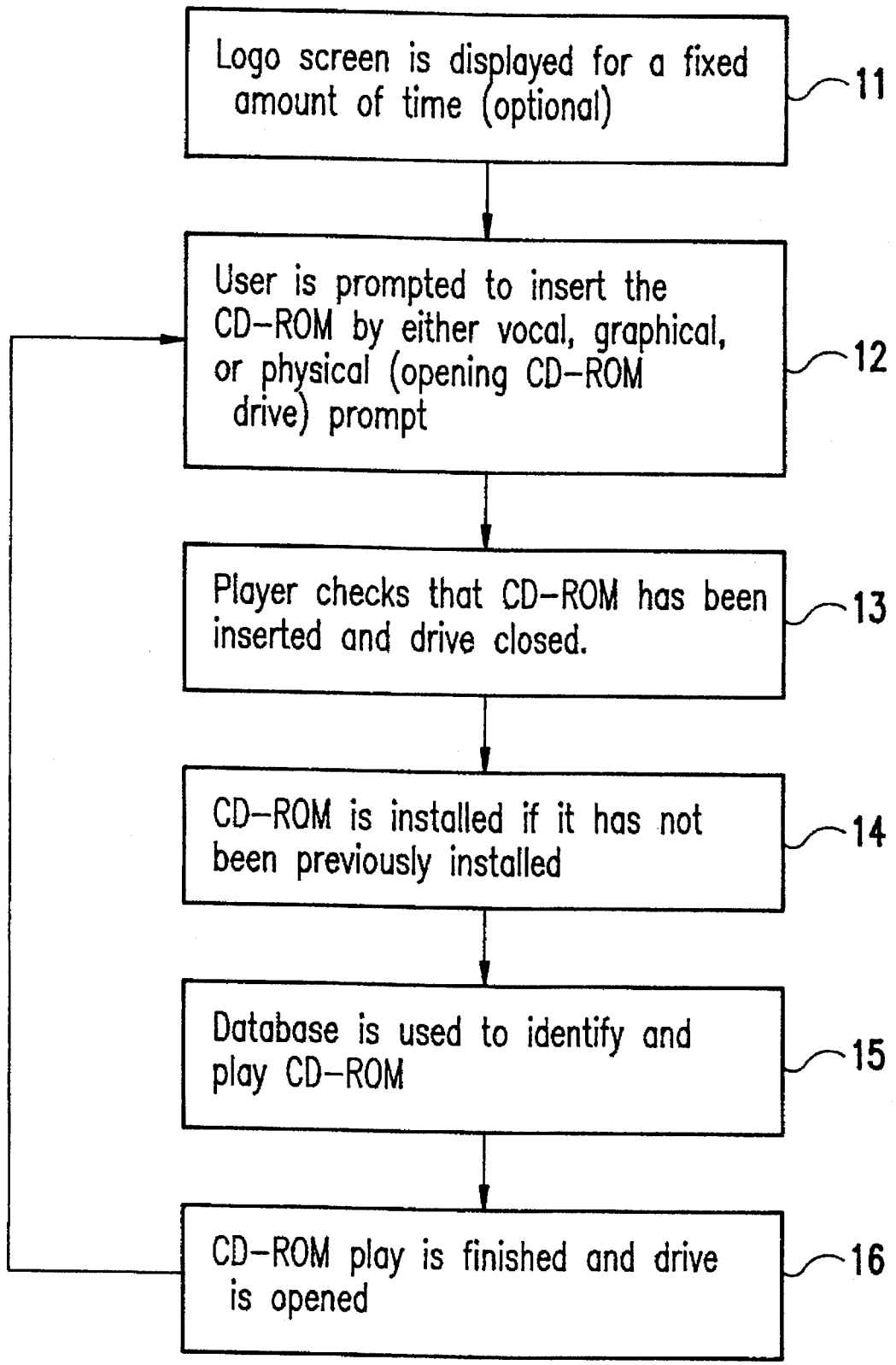

Referring now to the drawings, and more particularly to FIG. 1, there is shown a flow diagram showing the sequence of events that occurs when the CD-ROM player according to the invention is switched on. In the first step, function block 11, a logo screen is displayed for a fixed amount of time. This is optional but provides immediate user feedback that the process has successfully begun. In the second step, function block 12, the user is prompted to insert the CD-ROM disk into the player. The prompting of the user may be visually or aurally or both coupled with opening the CD-ROM drive to receive the CD-ROM disk. In a preferred embodiment, the CD-ROM player includes a connection to a conventional television (TV) receiver as a display. Such a TV receiver, which most users of the CD-ROM player will most likely already have, can provide both the visual and audio output of the CD-ROM player. Alternatively, a graphic display, such as a computer RGB (red-green-blue) display, and external speakers can be connected to the CD-ROM player.

In step three, function block 13, the CD-ROM player checks to determine if the CD-ROM disk has been inserted and the drive closed. It is known how to write software which opens a CD-ROM drive, or ejects the CD-ROM disk tray, to make the drive available for inserting or removing the CD-ROM disk. It is also known how to write software that checks whether or not the CD-ROM disk with a particular file structure has been inserted in the CD-ROM drive. Thus, these first three steps are easily accomplished without user intervention beyond inserting the CD-ROM disk in the drive.

Next, in function block 14, a determination is made as to whether the CD-ROM disk has been previously installed and, if not, it is installed at this time. Two procedures are required to install the CD-ROM disk. First, a database that can identify installed CD-ROM disks is kept. The database can use a unique file name, or a unique property associated with the file on the disk, or a unique tag about each CD-ROM disk. An example of a database that can uniquely identify CD-ROM disks is as follows:

```
CD-ROM1:UniqueFilename1,# of sectors written
CD-ROM2:UniqueFilename2,# of sectors written
        .
        .
        .
CD-ROMn:UniqueFilenamen,# of sectors written
```

This database associates the names of the CD-ROMs to unique filenames of files stored on the disks with the number of total written sectors of the disks. The number of written sectors on a CD-ROM disk is a numerically large random number, and together with filenames on a disk, a disk can be uniquely identified.

This database, or part of it, can be provided with the player (in the case of factory installed or pre-installed database), or it can be built or added on as a new CD-ROM disk is being installed. In this way, once a CD-ROM disk has been pre-installed or installed, the player can use each disk's unique identifier to immediately recognize the disk on subsequent insertions or use. The building and keeping of this database requires no user intervention regardless of the convention chosen to identify each disk's unique identifier. The second procedure for step four is the creation of a sequence of commands which will execute the program on the CD-ROM disk for the particular hardware configuration of the player. This sequence of commands must be indexed to the database which holds the unique characteristics or requirements of each installed CD-ROM disk. Thus, the player, after recognizing a particular CD-ROM disk by its unique identifier, can immediately execute the sequence of commands necessary for playing that disk. Currently, this sequence of commands requires the user to have an intimate knowledge of the hardware configuration of the machine to play a particular disk. In the preferred embodiment of the invention, there are two methods which eliminate the need for user knowledge and intervention in the second procedure of step four.

One method is for the software or content providers, referred to as independent software vendors (ISVs), to place the sequence of commands necessary for the hardware configuration of the player on the CD-ROM disk itself, with a unique file name or other attributes that the player could readily identify. An example of files on a CD-ROM disk for installation and subsequent play is as follows:

| UniqueNameFile1: | executable or batch file to install audio and video configuration files for the player |
| UniqueNameFile2: | executable or batch file to run this CD-ROM disk |
| UniqueNameFile3: | other optional instructions for the player that is specific to play this CD-ROM disk |

Since this would involve modifying existing CD-ROM disks and ISVs may be hesitant and reluctant to do so, the sequences of commands to play all existing and previously manufactured CD-ROM disks can be provided within the CD-ROM player, and it can be factory installed (i.e., pre-installed). The storage space requirements to achieve this is easily manageable, and the content can be stored in its entirety inside the player. The stored list of all these pre-installed CD-ROM disks, when included within the player, will allow all existing CD-ROM disks to be played. Thus, the player can play existing disks that do not have the sequences of commands, or future disks which contain the sequence of commands. A second method would supply a continually updated list of CD-ROM installation procedures, which could be installed by the user on the player, for installing CD-ROMs which are not pre-installed on the player.

ISVs sometimes store some of the files necessary to play a CD-ROM on the user's read/write storage; e.g., the computer system's hard drive. This utilization is typically done to take advantage of the faster throughput of the hard disk relative to the CD-ROM drive. Information for which files to copy during installation can be relayed to the player utilizing either of the above two methods which would again obviate user intervention.

Once the CD-ROM disk is installed in step four, a database entry exists for identifying and executing the correct sequence of commands to run the CD-ROM. This takes place in step five, function block 15, and again requires no user intervention. Finally, upon termination of the application by the user, the CD-ROM drive is opened in function block 16 using well known software techniques which do not require user intervention. Thus, the player requires only that the user insert the CD-ROM disk and the player automatically executes the program on the CD-ROM disk.

Figure 2A:
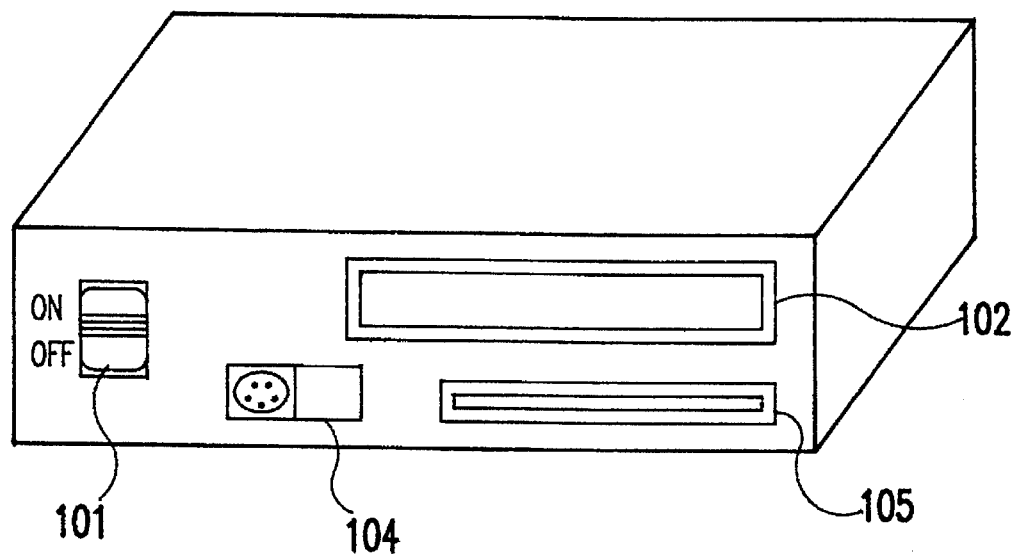
FIGS. 2A and 2B are, respectively, front and rear three quarter views of an illustrative CD-ROM player.
Figure 2B:
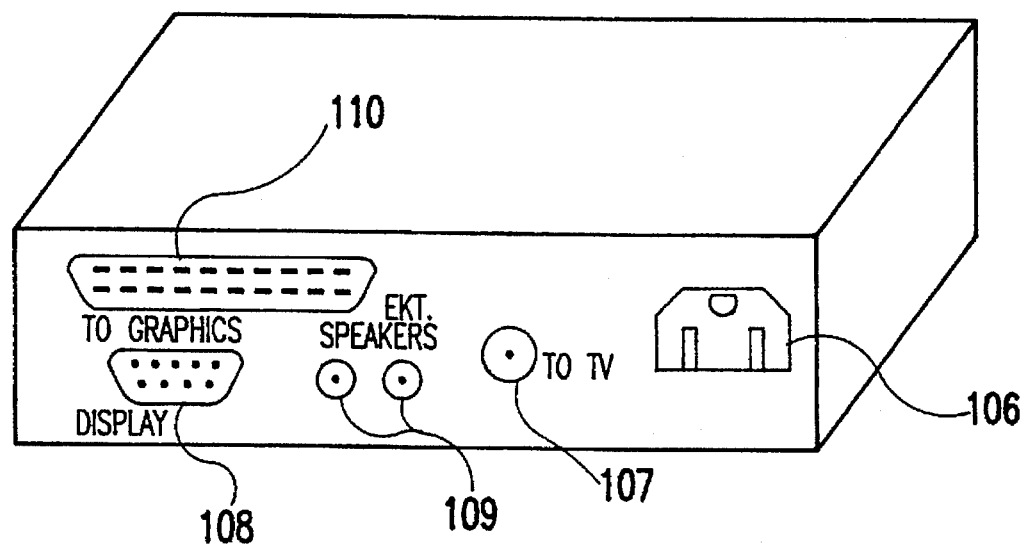

FIGS. 2A and 2B respectively show front and rear three quarter views of an illustrative example of a CD-ROM player according to a preferred embodiment of the invention. Positioning of switches, components and connections in the front and back panels are for illustrative purposes only, and those skilled in the art will recognize that modifications can be made to the example shown. Referring first to FIG. 2A, the front panel is provided with an on/off power switch 101, a front loading CD-ROM driver 102, and a connection/sensor port 104. This port 104 is for wired or wireless (e.g., infrared) remote control of the player. To support user interactive CD-ROM programs, a preferred remote control device is a keyboard/trackball comb/nation with an infrared transmitter. In addition, an optional diskette drive 105 may be provided. This diskette drive would be used, for example, to update CD-ROM disk files within the player as new CD-ROM titles are released. In the alternative, the drive 105 may be replaced with a PCMCIA (personal computer memory card industry association) card reader.

FIG. 2B shows the back panel of the player on which is provided an AC power connector 106, a radio frequency (RF) connector 107 for connection to a conventional TV receiver, an optional RGB connection 108 to an alternate graphics display, and optional external speaker connections 109. To provide an optional connection to a personal computer, a bi-directional parallel port connector 110 may be provided. This connector would be connected to the personal computer's parallel port as the only hardware connection necessary. When connected to a personal computer, the computer's keyboard, mouse or trackball, and display would be used instead of similar devices connected to the CD-ROM player.

Figure 3:
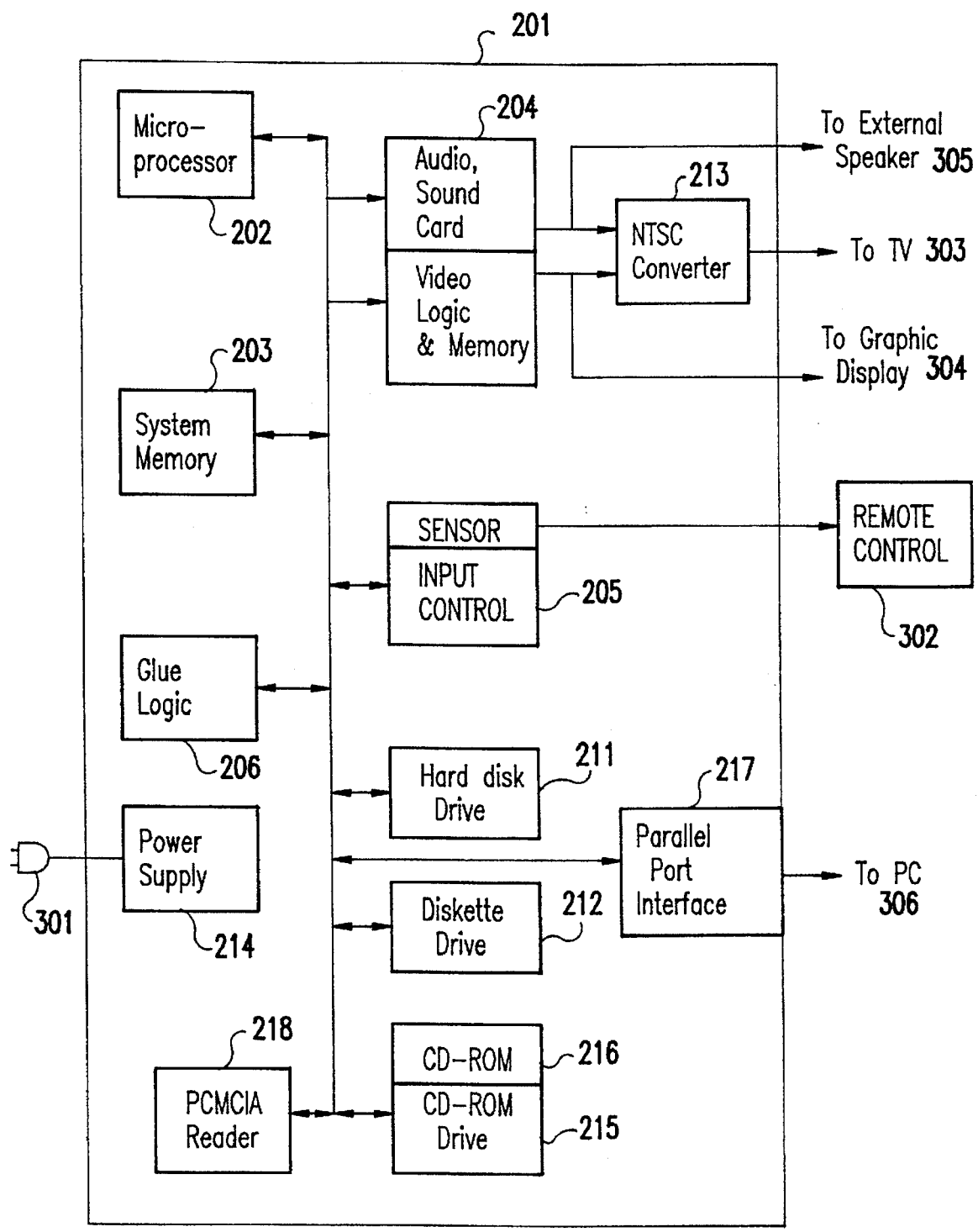
FIG. 3 is a block diagram showing the architecture of the CD-ROM player according to the invention.

FIG. 3 shows a block diagram of the player. As shown, the player 201 includes the building blocks of a typical multimedia enabled personal computer including a microprocessor 202, system memory 203 comprising both random access memory (RAM) and read only memory (ROM), audio sound and video logic 204, input control and/or sensor logic 205, and other necessary logic 206, all connected to a system bus 207. As mentioned, the preferred embodiment of the invention allows the CD-ROM to be directly connected to a user's TV receiver, and for this purpose an NTSC converter 213 is connected to the audio sound and video logic 204.

Also connected to the system bus 207 are a hard disk drive 211, an optional diskette drive 212, and a CD-ROM drive 215 in which a CD-ROM disk 216 is inserted. The hard disk drive 211 stores the database file which uniquely identifies the CD-ROM disks. The hard disk drive 211 also stores those files necessary to play a program on CD-ROM disk. These files include the correct sequence of commands to run the program. As mentioned, this database file may be pre-installed and added to or built as a CD-ROM disk is installed. In the alternative, the system memory 203 can include flash memory (react/write storage) which stores the database file. In either case, the optional diskette drive 212 can be used to update the database file, whether stored on the hard disk drive 211 or a flash memory. In the alternative, a PCMCIA card can be used to update the database or even to store the database in lieu of the hard disk. Updating the database is simply done by inserting a new PCMCIA card into the PCMCIA card reader 218.

The CD-ROM player 201 has external connections to AC power via plug 301 which is connected to the internal power supply 214, wired or wireless remote control 302, an RF connector 303 to a TV, and optional connections to a computer display 304 and external speakers 305.

In practice, the CD-ROM player is simply connected to a TV receiver via the RF connector 303, much the same as a VCR, and plugged into a wall outlet via the AC power plug 301. The user then simply turns on the CD-ROM player and TV and inserts a CD-ROM disk in the CD-ROM drive 215. Installation of the CD-ROM disk and playing the program on the disk is automatic, requiring no user intervention. The TV provides both visual and audio outputs. A remote control to support user interactive programs on CD-ROM disks is preferably by a keyboard with integral trackball which may be connected either by a wire or by an infrared link. Other remote control interfaces may of course be used as appropriate to the CD-ROM programs being played.

In the alternative, a separate graphics display may be provided, in which case the display is connected to output 304. Optional speakers may be connected to output 305. If the user desires to connect the CD-ROM player to a personal computer, the connection may be made to the computer's parallel port. To support this option, a bi-directional parallel interface 217 connected to the system bus 207 may be added. The output of this interface is connected to the parallel port 306. In this case, the user merely needs to connect the CD-ROM player to the computer's parallel port with a suitable parallel cable. Software installation is required for this option, but this installation is limited to an automatic install program loaded from a diskette inserted in the personal computer. After installation, the CD-ROM player appears as drive D on the computer system which, upon access, operates the same as before except that the computer's keyboard, mouse or trackball, and graphics display provide the direct user interface via the parallel port connection. Using this option, the user can easily upgrade an older computer, which may not be upgradable using conventional techniques, to full multi-media capability without having to install adapter cards or complete a complex reconfiguration process.

The CD-ROM player according to the invention can install and execute programs on a CD-ROM disk automatically, the only user action being inserting a CD-ROM disk in the CD-ROM drive. The ease of use is equivalent to that of VCR. This CD-ROM player is suitable for rental business opportunities, either rental of CD-ROM disks or the player or both, similar to rental of VCR tapes and players. Using, for example, the PCMCIA card reader 218, it is possible to configure the CD-ROM player at the time of rental such that it could play only the rented CD-ROM disk, thus preventing unauthorized use of the player for other CD-ROM disks and reducing the risk that the player would not be returned to the rental company.

While the invention has been described in terms of a single preferred embodiment with various options, those skilled in the art will recognize that the invention can be practiced with modification within the spirit and scope of the appended claims.

Having thus described our invention, what we claim as new and desire to secure by Letters Patent is as follows:

1. A CD-ROM player which can install and execute programs on CD-ROM disks automatically, said programs being written for personal computers running a non-proprietary operating system, said CD-ROM player comprising:

a CD-ROM drive for receiving CD-ROM disks;

user interface means operable to prompt a user to insert a CD-ROM disk in the CD-ROM drive, said user interface means including an output to a video display for displaying program material played from a CD-ROM disk;

storage means for storing a database uniquely identifying CD-ROM disks storing programs written for personal computers; and means for reading the CD-ROM disk inserted in the CD-ROM drive and for accessing said storage means to automatically identify and execute a correct sequence of commands to play a program stored on the CD-ROM disk.

2. The CD-ROM player recited in claim 1 wherein said user interface means includes a connection to a television receiver, the television receiver providing both audio and visual output for the CD-ROM player.

3. The CD-ROM player recited in claim 1 wherein said user interface further includes a remote control input for providing user inputs to support user interactive programs on a CD-ROM disk.

4. The CD-ROM player recited in claim 3 wherein the remote control input includes a wireless connection to a remote control device.

5. The CD-ROM player recited in claim 1 wherein the storage means includes a hard disk storing the database and any files necessary to run a CD-ROM disk uniquely identified in the database.

6. The CD-ROM player recited in claim 1 wherein said database is pre-installed on said storage means.

7. The CD-ROM player recited in claim 1 further comprising means for updating said database to include a CD-ROM disk not uniquely identified in the database.

8. The CD-ROM player recited in claim 7 wherein said means for updating includes a diskette drive for reading files which are added to said database.

9. The CD-ROM player recited in claim 7 wherein said means for updating includes a PCMCIA reader for reading files which are added to said database.

10. The CD-ROM player recited in claim 1 wherein said user interface means includes a connection to a graphic display device.

11. The CD-ROM player recited in claim 10 wherein said user interface further includes a connection to external speakers.

12. A CD-ROM player which can install and execute programs on CD-ROM disks automatically, said programs being written for personal computers running a non-proprietary operating system, said CD-ROM player comprising:

a CD-ROM drive for receiving CD-ROM disks;

a connection to a television receiver, said television receiver providing both audio and visual output for the CD-ROM player;

prompting means operable upon turning on the CD-ROM player for prompting a user to insert a CD-ROM disk in the CD-ROM drive;

remote control means for providing user inputs to support user interactive programs on CD-ROM disks;

storage means for storing a database uniquely identifying CD-ROM disks storing programs written for personal computers; and means for reading a CD-ROM disk inserted in the CD-ROM drive and for accessing said storage means to automatically identify and execute a correct sequence of commands to the play a program stored on the CD-ROM disk.

13. The CD-ROM player recited in claim 12 wherein the remote control means includes a wireless connection to a remote control device.

14. The CD-ROM player recited in claim 12 wherein the storage means includes a hard disk storing the database and any files necessary to run a CD-ROM disk uniquely identified in the database.

15. The CD-ROM player recited in claim 14 wherein said database is pre-installed on said storage means.

16. The CD-ROM player recited in claim 15 further comprising means for updating said database to include a CD-ROM disk not uniquely identified in the database.

17. The CD-ROM player recited in claim 16 wherein said means for updating includes a diskette drive for reading files which are added to said database.

18. The CD-ROM player recited in claim 16 wherein said means for updating includes a PCMCIA reader for reading files which are added to said database.

* * * * *